United States Patent
Hjelm et al.

(10) Patent No.: US 8,162,382 B2
(45) Date of Patent: Apr. 24, 2012

(54) TRACTOR CABIN COMPRISING AT LEAST ONE FAIRING WITH AN AIR DEFLECTOR AND AIR DEFLECTOR FOR A TRACTOR CABIN

(75) Inventors: Linus Hjelm, Göteborg (SE); Björn Bergqvist, Askim (SE)

(73) Assignee: Volvo Lastvagnar AB, Göteborg (SE)

( * ) Notice: Subject to any disclaimer, the term of this patent is extended or adjusted under 35 U.S.C. 154(b) by 123 days.

(21) Appl. No.: 12/597,752

(22) PCT Filed: May 14, 2007

(86) PCT No.: PCT/SE2007/000462
§ 371 (c)(1),
(2), (4) Date: Oct. 27, 2009

(87) PCT Pub. No.: WO2008/140362
PCT Pub. Date: Nov. 20, 2008

(65) Prior Publication Data
US 2010/0060029 A1 Mar. 11, 2010

(51) Int. Cl.
*B60J 9/00* (2006.01)
(52) U.S. Cl. .................................. 296/180.3
(58) Field of Classification Search .............. 296/180.3, 296/180.2, 180.5, 91, 180.1, 180.4
See application file for complete search history.

(56) References Cited

U.S. PATENT DOCUMENTS

| | | | | | |
|---|---|---|---|---|---|
| 3,596,974 | A | * | 8/1971 | Adams | 296/180.2 |
| 3,929,369 | A | * | 12/1975 | Blair | 296/180.3 |
| 3,934,923 | A | * | 1/1976 | Lissaman et al. | 296/180.2 |
| 3,947,065 | A | * | 3/1976 | Geiger | 296/180.3 |
| 3,951,445 | A | * | 4/1976 | Tatom | 296/180.3 |
| 3,971,586 | A | * | 7/1976 | Saunders | 296/180.4 |
| 4,036,519 | A | * | 7/1977 | Servais et al. | 296/180.2 |
| 4,047,747 | A | * | 9/1977 | Beers | 296/180.3 |
| 4,056,279 | A | * | 11/1977 | Dorsch | 296/180.3 |
| 4,082,341 | A | * | 4/1978 | Gore | 296/180.2 |
| 4,084,846 | A | * | 4/1978 | Wiley et al. | 296/180.3 |
| 4,087,124 | A | * | 5/1978 | Wiley, Jr. | 296/180.2 |
| 4,102,548 | A | * | 7/1978 | Kangas | 296/180.3 |
| 4,156,543 | A | * | 5/1979 | Taylor et al. | 296/180.3 |
| 4,245,862 | A | * | 1/1981 | Buckley, Jr. | 296/180.3 |
| 4,290,639 | A | * | 9/1981 | Herpel | 296/180.3 |
| 4,375,898 | A | * | 3/1983 | Stephens | 296/180.3 |
| 4,458,937 | A | * | 7/1984 | Beckmann et al. | 296/180.3 |

(Continued)

FOREIGN PATENT DOCUMENTS

DE 3628412 A1 2/1998

(Continued)

OTHER PUBLICATIONS

European Search Report for corresponding EP 07 74 8126.

*Primary Examiner* — Kiran B Patel
(74) *Attorney, Agent, or Firm* — WRB-IP LLP

(57) ABSTRACT

A tractor cabin includes a frame with an upper cabin portion, a front cabin portion, a rear cabin portion and side cabin portions and at least one fairing connected to the frame. The at least one fairing includes at least one air deflector. The deflector is adjustable in its tilt angle with respect to the frame. The deflector includes a deflector body with a variable deflection along a longitudinal elongation of the deflector body. An air deflector is also provided.

10 Claims, 2 Drawing Sheets

U.S. PATENT DOCUMENTS

| | | | |
|---|---|---|---|
| 4,462,628 A * | 7/1984 | Gregg | 296/180.3 |
| 4,470,628 A * | 9/1984 | Husted | 296/180.3 |
| 4,509,786 A * | 4/1985 | Gregg | 296/180.3 |
| 4,607,874 A * | 8/1986 | Peairs | 296/180.3 |
| 4,611,796 A * | 9/1986 | Orr | 296/180.2 |
| 4,685,715 A * | 8/1987 | Hardin | 296/180.3 |
| 4,779,915 A * | 10/1988 | Straight | 296/180.3 |
| 4,904,015 A * | 2/1990 | Haines | 296/180.3 |
| 5,092,648 A * | 3/1992 | Spears | 296/180.3 |
| 5,429,411 A * | 7/1995 | Spears | 296/180.1 |
| 5,522,637 A | 6/1996 | Spears | |
| 5,536,062 A | 7/1996 | Spears | |
| 5,538,316 A * | 7/1996 | Bartholomew | 296/180.5 |
| 5,595,419 A * | 1/1997 | Spears | 296/180.2 |
| 5,653,493 A * | 8/1997 | Spears | 296/180.2 |
| 5,685,597 A * | 11/1997 | Reid | 296/180.1 |
| 6,139,090 A * | 10/2000 | Stidd | 296/180.5 |
| 6,183,041 B1 * | 2/2001 | Wilson | 296/180.1 |
| 6,428,084 B1 * | 8/2002 | Liss | 296/180.3 |
| 6,527,334 B2 * | 3/2003 | Oliver | 296/180.1 |
| 6,641,196 B1 * | 11/2003 | Hanagan | 296/78.1 |
| 6,846,035 B2 * | 1/2005 | Wong et al. | 296/180.1 |
| 6,886,882 B2 * | 5/2005 | Farlow et al. | 296/180.4 |
| 7,118,164 B2 * | 10/2006 | Frank et al. | 296/180.5 |
| 7,121,614 B2 * | 10/2006 | Kawai | 296/180.2 |
| 7,226,119 B1 * | 6/2007 | Weaver | 296/180.1 |
| 7,374,229 B1 * | 5/2008 | Noll et al. | 296/180.2 |
| 7,712,822 B2 * | 5/2010 | Pfaff | 296/180.2 |
| 7,862,067 B2 * | 1/2011 | Alguera | 280/438.1 |
| 7,876,202 B2 * | 1/2011 | Liljeblad et al. | 340/431 |
| 2003/0230677 A1 * | 12/2003 | Milliere | 244/213 |
| 2007/0257513 A1 * | 11/2007 | Schwartz | 296/180.3 |
| 2009/0184539 A1 * | 7/2009 | Pursley | 296/180.3 |
| 2010/0201152 A1 * | 8/2010 | Smith | 296/180.3 |
| 2011/0115254 A1 * | 5/2011 | Skopic | 296/180.3 |

FOREIGN PATENT DOCUMENTS

| | | |
|---|---|---|
| RU | 2013273 C1 | 8/2006 |
| WO | 2006091147 A1 | 8/2006 |

* cited by examiner

TRACTOR CABIN COMPRISING AT LEAST ONE FAIRING WITH AN AIR DEFLECTOR AND AIR DEFLECTOR FOR A TRACTOR CABIN

BACKGROUND AND SUMMARY

The invention relates to a tractor cabin comprising at least one fairing with an air deflector and an air deflector for a tractor cabin.

It is known in the art to provide fairings for tractor cabins of tractor trailer combinations in order to improve the aerodynamic properties and thus reduce fuel consumption of tractor trailer combinations. Usually, a deflector hood is installed on an upper portion of the tractor cabin and side air deflectors are provided for improving the wind flow around the tractor and a trailer connected to the tractor.

U.S. Pat. No. 5,536,062 A1 discloses fairings for a tractor trailer combination wherein segmented panels form an air deflector comprising opposing segmented side pivotal panels, opposing segmented upper side pivotal panels and opposing segmented lower side pivotal panels. The use of wing members either fixed or variably mounted on or about the various panels allows conditioning the wind flow.

It is desirable to provide a tractor cabin, particularly for a tractor trailer combination, with improved aerodynamic behaviour. It is desirable to provide an air deflector for a tractor cabin with improved aerodynamic behaviour.

A tractor cabin according to an aspect of the invention comprises a frame with an upper cabin portion, a front cabin portion, a rear cabin portion and side cabin portions and at least one fairing connected to the frame, wherein the at least one fairing comprises at least one air deflector, wherein the deflector is adjustable in its tilt angle with respect to the frame. The deflector comprises a deflector body with a variable deflection along a longitudinal elongation of the deflector body. This allows having locally different deflection along the longitudinal elongation of the deflector and adjusting the deflection as a function of operation parameters of the tractor cabin, for example, there are different legal limits for the width of the tractor cabin in various countries. The invention allows, according to aspects thereof, for adjustment of the span width of side air deflectors of a fairing on the fly according to an actual legal limit when the tractor trailer combination travels from one country to another country. Preferably, the longitudinal elongation of the deflector is parallel to an edge of the cabin frame to which the deflector is coupled, e.g. the longitudinal elongation (or length) of a side air deflector is parallel to a vertical edge of the cabin frame, whereas the longitudinal elongation of a deflector on the upper cabin portion is parallel to a horizontal edge of the cabin frame. The transversal elongation represents the width of the deflector.

Preferably, at least a portion of the deflector body can be formed of a torsional flexible material. Preferably, the side air deflector as a whole is made of such a torsional flexible material. By coupling appropriate actuators to the deflector at convenient locations, the deflection of the deflector can be varied in fine and/or coarse increments along the longitudinal deflector elongation.

The deflector can comprise at least one portion formed integrally of one piece with the deflection of the portion being variable along the longitudinal elongation of the deflector. In a convenient embodiment, the complete bodies of the side air deflectors are integrally formed of one piece each.

Actuator means can conveniently be provided for varying the tilt angle and/or the curvature of the deflector with respect to the frame. The deflector can be tilted outwards with respect to the cabin frame to provide a wider span width or it can be tilted inwards depending on operation parameters of the vehicle, e.g. on a vehicle speed, a wind speed or a legal limit of the allowable span width of the tractor and the side air deflector connected to the cabin, respectively, and the like.

Preferably, the tilt angle of the deflector is selectively switchable between a minimum and a maximum angle at different portions of the deflector body. By changing the tilt angle, the deflector span width, e.g. of the side air deflector, can be increased or decreased without varying the curvature of the deflector and, vice versa, by changing the curvature, the deflector span width can be increased or decreased without changing the tilt angle. This can be done differentially along the longitudinal elongation of the deflector. However, both parameters can also be varied simultaneously as well. The deflector can also be an air deflector on the upper cabin portion. A skilled person will choose a variation appropriate to the actual situation and/or result which shall be achieved by varying the deflector.

The curvature of the deflector can be variable, particularly continuously variable. This can be generated by an appropriate distribution of actuators on or in the deflector body.

Preferably, the deflector can be a side air deflector which is connected to a deflector hood on the upper cabin portion. Alternatively or additionally, the deflector can also be an air deflector on the upper cabin portion.

As side air deflector, the deflector portion formed integrally of one piece can favourably span a major portion of a vertical edge of the frame. A rigid deflector portion can be arranged between the deflector hood and the deflector with variable deflection. The rigid portion can be an integral part of the otherwise torsional flexible deflector body. By this embodiment it can avoided to hinge a separate side air deflector to the rigid part above it, thus avoiding a detrimental effect on the wind flow such as aerodynamic drag. A mismatch in the joint area between the adjustable portion and the upper fixed portion can be obviated.

According to another aspect of the invention, an air deflector is suggested, particularly for a tractor cabin, with a longitudinal elongation and a transversal elongation, comprising a deflector body with a variable deflection along the longitudinal elongation of the deflector body. Thus, a span width of a deflector can easily be adjusted to a desired value.

Preferably, at least a portion of the deflector body is formed of a torsional flexible material. Thus it is possible to provide a deflector causing no or only minor aerodynamical drag due to a mismatch between deflector portions of different deflection and/or orientation.

Favourably, at least one portion can be formed integrally of one piece with the deflection of the portion being variable along the longitudinal elongation of the deflector.

According to an advantageous embodiment, actuator means can be provided for varying a tilt angle and/or a curvature of the deflector body. The actuator means can be at least any one of the group of e.g. pneumatic actuators distributed on or in the deflector body comprising inflatable cavities and/or ducts which cause the deflector body to bend when activated and to relax when deactivated (or vice versa); and/or hydraulic or pneumatic drives attached to the deflector body causing the body to tilt with respect to the cabin frame; and/or electric nanoactuators such as nanostructures, e.g. nanotubes, made of Buckminster fullerene materials which can be activated by application of an electrical voltage and which can extend or contract and bend or tilt the deflector body; and/or piezoelectric actuators, and/or elastomer material which can be reversibly deformed; and/or shape memory materials, which can change shape, dimension and/or stiffness by experiencing an activation signal; and/or a elastically deformable plate material with an hydraulic adjusting mechanism for bending or unbending the material; and the like.

Preferentially, the tilt angle of the deflector can be selectively switchable between a minimum and a maximum angle at different portions of the deflector body. Thus, the span widths of side air deflectors can be switched between desired values. It is possible to provide different tilt angles along the longitudinal elongation of the deflector.

Additionally or alternatively, the curvature of the deflector can be variable, particularly continuously variable, along the longitudinal elongation.

It is understood that while the invention is described mounted on a tractor having a trailer pivotally and detachably mounted thereto that the invention can be applicable to other types of trucks such as van type trucks, having the trailer section rigidly and permanently attached to the tractor section.

BRIEF DESCRIPTION OF THE DRAWINGS

The present invention together with the above-mentioned and other objects and advantages may best be understood from the following detailed description of the embodiment, but not restricted to the embodiment, wherein is shown schematically.

In the drawings, equal or similar elements are referred to by equal reference numerals.

DETAILED DESCRIPTION

Figure 1:
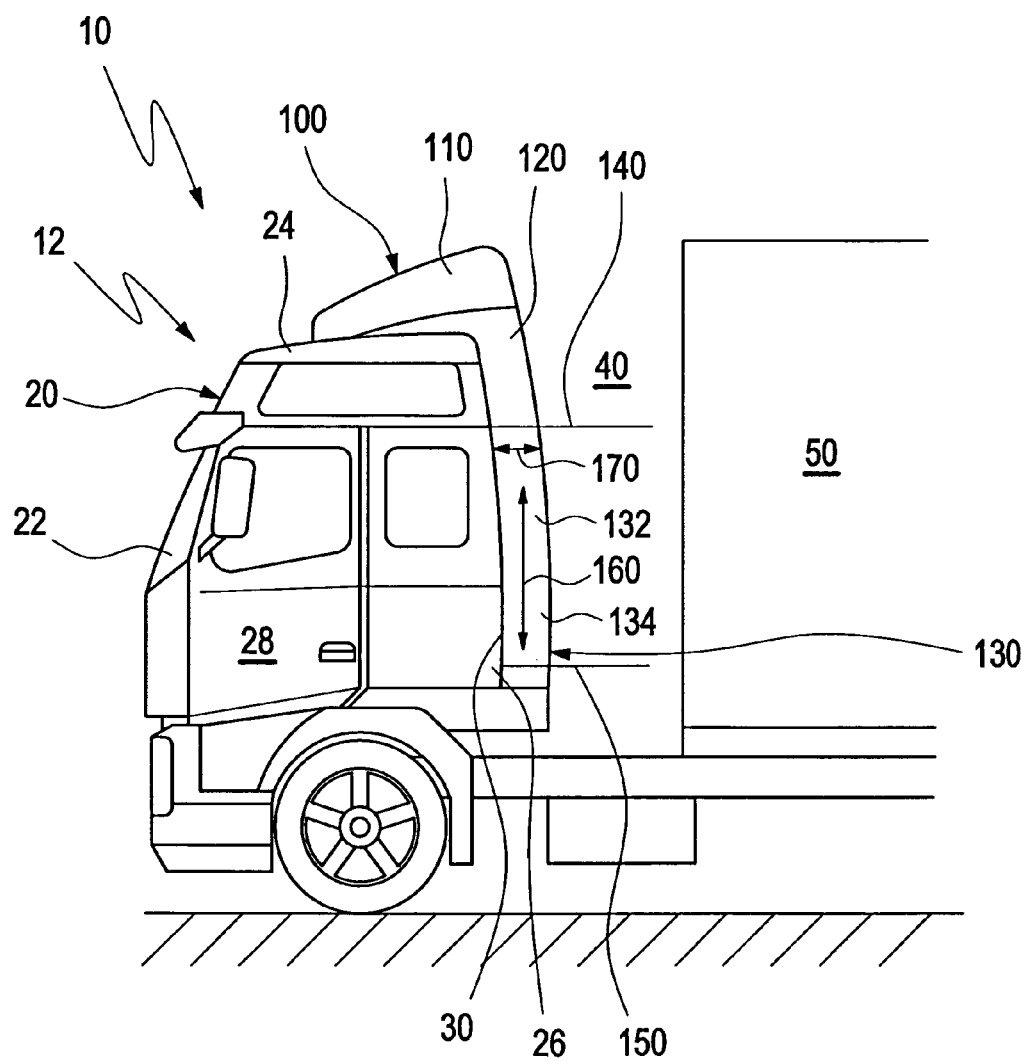
FIG. 1 a side view of a preferred tractor trailer combination with a preferred side air deflector according to the invention.

FIG. 1 depicts a side view of a preferred tractor 10 with a tractor cabin 12 comprising a frame 20 with an upper cabin portion 24, a front cabin portion 22, a rear cabin portion 26 and side cabin portions 28 and at least one fairing 100 connected to the frame 20.

The fairing 100 comprises an air deflector 110 mounted on the upper cabin portion 24 and a side air deflectors 130 with an opposing side air deflector (not shown), wherein the deflector 130 is adjustable in its tilt angle with respect to the frame 20. The side air deflector 130 at its upper end is connected to a fixed, rigid deflector portion 120.

The deflector 130 comprises a deflector body 132 with a variable deflection along a longitudinal elongation 160 of the deflector body 132, which is made of a torsional flexible material with a torsional flexibility intentionally built into the material.

The longitudinal elongation 160 is parallel to a vertical edge 30 at the rear cabin portion 26 of the cabin frame 20 with a transversal elongation 170 directing parallel to a vehicle axis. The deflector 130 guides an air stream impinging on the front cabin portion 22 away from a gap 40 between the tractor 10 and a trailer 50 attached to the tractor 10. Typically, the tractor cabin 12 has a smaller span width near the upper cabin portion 24 than in lower areas of the frame 20. With the side air deflector 130 attached, a horizontal line 140 indicates a first local span width of the deflector 130 and a horizontal line 150 indicates a second local span width of the deflector 130.

The deflector 130 is formed of a portion 134 formed integrally of one piece with the deflection of the portion 134 being variable along the longitudinal deflector elongation 160, wherein the fixed deflector portion 120 is integrated in the portion 134.

Actuator means 200 (shown schematically in FIG. 2) are provided for varying the tilt angle and/or the curvature of the deflector 130 with respect to the frame 20.

Figure 2:
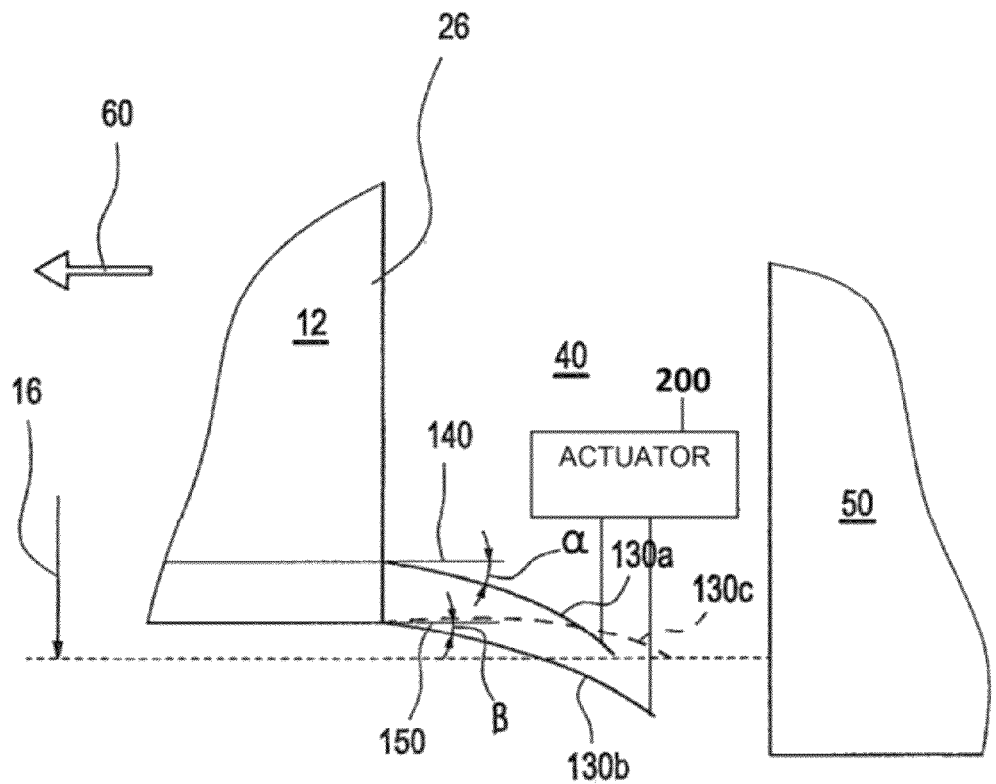
FIG. 2 a top view of the tractor trailer combination of FIG. 1.

As can be seen in the top view of the tractor trailer combination in FIG. 2 with reference to FIG. 1, the span width of the deflector 130 at the horizontal line 140 is smaller than at the horizontal line 150. A forward driving direction is indicated by an arrow 60. The trailer 50 is broader than the cabin 12 which is smaller than a width limit 16 for trailer cabins 12. The width limit 16 can be a legal limit for the cabin width for several countries and be less than a legal limit for the cabin width for other countries.

A side air deflector 130 overlaps with a major fraction of a gap 40 between a rear cabin portion 26 of the tractor cabin 12 and the trailer 50 and prevents an air stream to enter the gap 40.

At the upper line 140, the contour of the deflector portion 130a is within the width limit 16, whereas the solid line at the lower horizontal line 150 indicates that a part of the contour of the deflector portion 130b is outside the width limit 16. This situation is exemplary if the tractor trailer combination drives in a country with a bigger cabin width limit than width limit 16. As can be seen, the curvatures of the deflector portions 130a and 130b can be different. The curvature can be adjusted by actuator means (not shown) or by using a flexible material which self adjusts the curvature depending on the air stream experienced by the air deflector 130.

The deflector portion 130a includes a small tilt α angle between a line principally perpendicular to the rear portion 26 of the tractor cabin 12, and the deflector portion 130b includes a small tilt angle β between a line principally perpendicular to the rear part of the tractor cabin 12 and the foot of the deflector portion 130a starting from its interface with the frame 20. If the tractor trailer combination drives in a country with a legal cabin width limit equal to width limit 16, the deflector portion 130b can be pulled back by reducing the tilt angle β and/or the curvature of the deflector portion 130b, as indicated by the dashed line 130c. In this case, the deflector portion 130c starts parallel to the perpendicular lines mentioned above with no tilt angle included.

The invention has been described for side air deflectors 130. However, it is understood, that the same principle can be applied to the deflector hood. Additionally, the shape of the deflector 130 can be changed not only with respect to legal width limits but also to a desired air deflection, which may depend on a vehicle speed, a specific trailer type attached to the tractor and the like.

The invention claimed is:

1. Tractor cabin comprising a frame with an upper cabin portion, a front cabin portion, a rear cabin portion and side cabin portions and at least one fairing connected to the frame, wherein the at least one fairing comprises at least one air deflector, wherein the deflector is adjustable with respect to a tilt angle of the deflector relative to the frame, wherein the deflector comprises a deflector body adapted to vary in deflection along a length of the deflector body.

2. The tractor cabin according to claim 1, wherein at least a portion of the deflector body is formed of a flexible material.

3. The tractor cabin according to claim 1, wherein the deflector comprises at least one portion formed integrally of one piece with the deflection of the portion being adapted to vary along the length of the deflector.

4. The tractor cabin according to claim 1, wherein actuator means are provided for varying the tilt angle and/or the curvature of the deflector with respect to the frame.

5. The tractor cabin according to claim 4, wherein the tilt angle of the deflector is selectively switchable between a minimum and a maximum angle at different portions of the deflector body.

6. The tractor cabin according to claim 4, wherein the curvature of the deflector is adapted to vary.

7. The tractor cabin according to claim 1, wherein the deflector is a side air deflector which is connected to a deflector hood on the upper cabin portion.

8. The tractor cabin according to claim 7, wherein the deflector comprises at least one portion formed integrally of one piece with the deflection of the portion being adapted to vary along the length of the deflector and the deflector portion formed integrally of one piece spans a major portion of a vertical edge of the frame.

9. The tractor cabin according to claim 1, wherein the deflector includes a deflector hood on the upper cabin portion and a rigid deflector portion is arranged between the deflector hood and the deflector body.

10. The tractor cabin according to claim 1, wherein the length of the deflector body extends between a first end and a second end of the deflector body, and at least one of the first end and the second end is fixed to a rigid structure.

* * * * *